Feb. 16, 1932.     O. C. RITZ WOLLER     1,845,334
LICENSE PLATE HOLDER
Filed Jan. 15, 1930
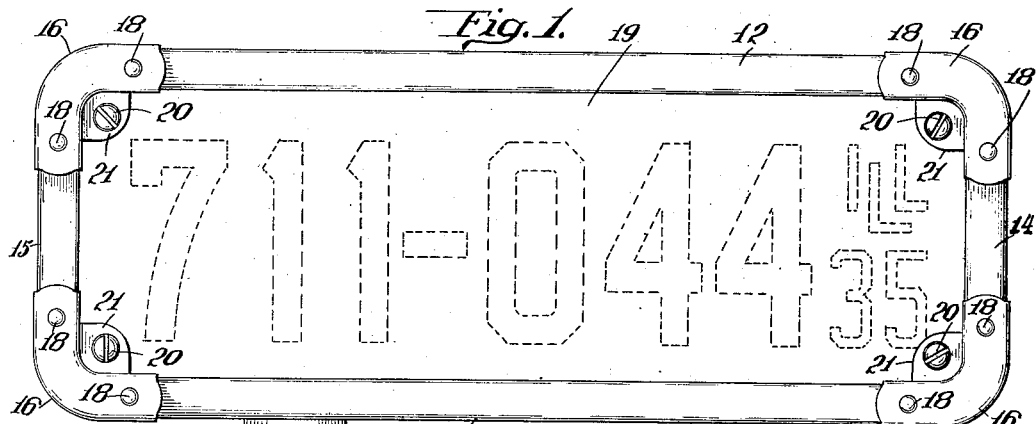
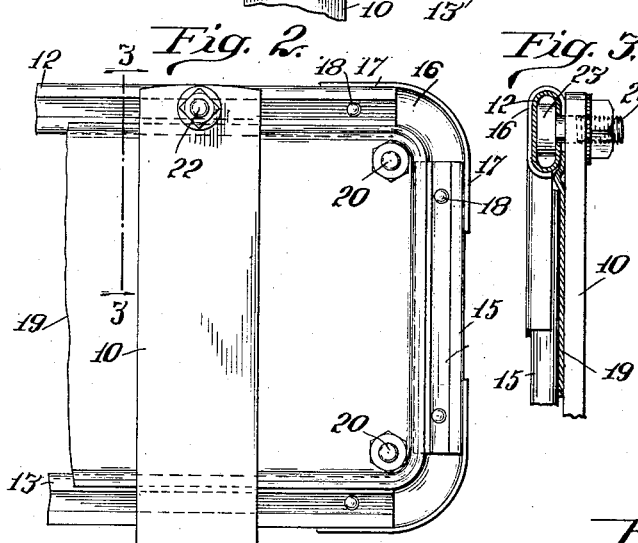
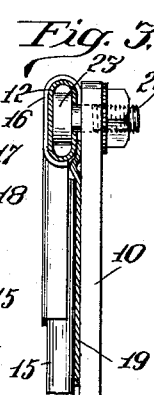
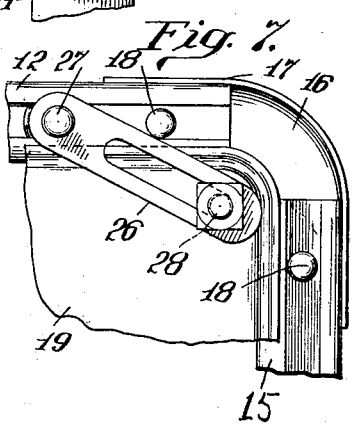
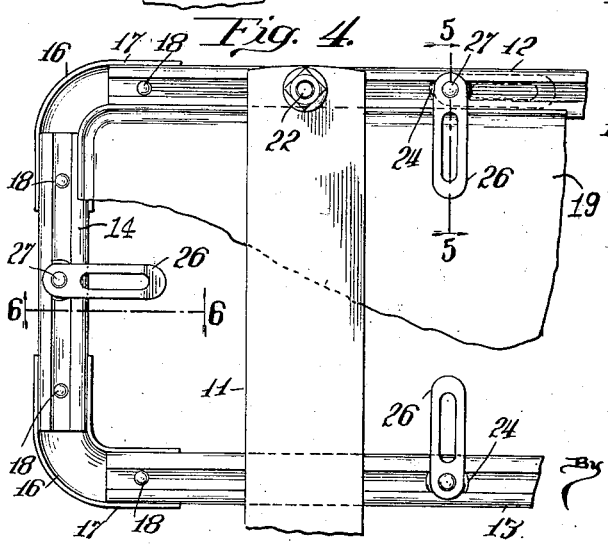
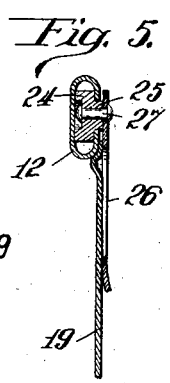
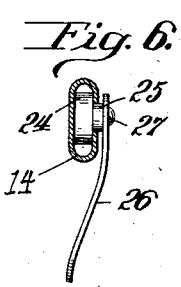

Patented Feb. 16, 1932

1,845,334

UNITED STATES PATENT OFFICE

OLIVER C. RITZ WOLLER, OF CHICAGO, ILLINOIS

LICENSE PLATE HOLDER

Application filed January 15, 1930. Serial No. 420,824.

My invention relates to holders or supports for license plates on automobiles and has for its object the provision of a new and improved arrangement of parts adaptable to a great variety of conditions with respect to the size and shape of the plate and with respect to the number and position of bolt openings therein. It is one of the objects of my invention to provide an improved arrangement of parts for connecting the holder fixedly in position on an automobile and to provide adjustment of such parts for making the device readily adaptable to different arrangements of supporting brackets. It is another object of my invention to provide new and improved means for detachably connecting a license plate in position on the support so as to be held firmly in position thereon while at the same time being readily and quickly detachable therefrom when desired.

It is one of the objects of my invention to provide a support of this type in the form of a frame which is preferably made of soft metal such as aluminum so as to be capable of being polished readily, the frame being formed in such manner as to have the requisite strength and rigidity without the use of auxiliary bracing or reenforcing parts in addition to the regular frame members.

It is another object of my invention to improve devices of this type in sundry details hereinafter pointed out. The preferred means by which I have accomplished my several objects are illustrated in the drawings and are hereinafter specifically described. That which I believe to be new and desire to cover by Letters Patent is set forth in the claims.

In the drawings,—

Fig. 1 is a face view of my improved holder with a license plate indicated by dotted lines thereon;

Fig. 2 is a rear view of one end portion of the parts shown in Fig. 1, but with the license plate shown in solid lines;

Fig. 3 is a vertical cross section taken at line 3—3 of Fig. 2.

Fig. 4 is a rear face view of one end portion of a device embodying a modification;

Figs. 5 and 6 are vertical cross sections taken at line 5—5 and at line 6—6, respectively, of Fig. 4; and Fig. 7 is a view of a portion of a plate and holder showing a modified form of construction, the part shown in Fig. 7 corresponding to the upper right-hand corner portion as shown in Fig. 2.

Referring now to Figs. 1 to 3 of the drawings, in which corresponding parts are indicated by the same reference characters, 10 and 11 indicate supporting bars such as are ordinarily carried by automobiles for supporting a license plate therefrom. Upon the upper ends of the supporting bars 10 and 11, I have mounted a frame comprising two oppositely disposed slotted tubular bars 12 and 13 connected at their ends with oppositely disposed slotted tubular bars 14 and 15, the connection in the construction shown being effected by the use of corner brackets 16; the corner brackets being provided with flanges 17 at opposite sides adapted to engage the edge faces of the bars 12, 13, 14 and 15. In the construction shown, the corner brackets 16 are connected with the bars of the frame by means of rivets 18. A license plate 19 is secured in position on the rear face of the frame by means of bolts 20 passing through suitable openings in the plate 19 and registering openings in gussets 21 forming parts of the corner brackets 16.

The means for connecting the frame with the supporting bars 10 and 11 comprises bolts 22, the heads 23 of which are slidably mounted in the top slotted tubular bar 12, as is best shown in Fig. 5, the arrangement being such that the bolts 22 are slidable to any desired adjusted position with respect to each other corresponding to the spacing of the supporting bars 10 and 11 or such other supporting parts as may be provided. In the construction shown, the heads 23 of the bolts are square so as to hold the bolts from rotating with respect to the tubular bars.

In the construction shown in Figs. 4, 5 and 6, a license plate 19 is held in position on the rear face of the frame by means of a plurality of spring devices slidably mounted in the tubular bars of the frame, six of said devices being preferably used. In the arrangement shown in said Fig. 4, each spring device comprises a block 24 having a sliding fit in the frame bar, with a neck portion 25 projecting beyond the face of the bar for supporting a flat spring 26 held in position thereon by a rivet 27. As is best shown in Fig. 6, each of the springs 26 is shaped normally so as to extend backwardly to a slight extent with respect to the neck portion 25, with the result that when a plate 19 is in position as shown in Fig. 3 such spring 26 serves to press tightly against the face of the license plate 19 for holding it securely in position. In such arrangement the bolts 20 and gussets 21 are preferably omitted. It will be appreciated that the spring devices comprising the lugs or fingers 26 may be adjusted to any desired point along the bars so as not to interfere with the supporting bars 10 and 11.

As is clearly shown in Fig. 4, each of the spring fingers 26 is capable of being swung about the rivet 27 by which it is mounted in position into substantially longitudinal alignment with the tubular frame bar. With the spring fingers in such position, (see the dotted line showing in said Fig. 4), the plate 19 is entirely freed from the frame. It is clear accordingly that it is a very easy matter to release one plate 19 and to insert another. At the same time, with the spring fingers in their solid line positions, the plate 19 is held very securely against vibration and against accidental escape.

In the device as shown in Fig. 7, the construction is the same as that shown in Figs. 4, 5 and 6, except that bolts 28 are provided extending through registering openings in the plate and the spring fingers 26.

By the use of my improved construction, I have provided a license plate holder which is very readily produced and very readily assembled and which is nevertheless very effective for supporting a plate removably in position. In the manufacture of the device, it is a very easy matter to vary the size of the frame to fit different specifications, it being necessary merely to vary the lengths of the oppositely disposed tubular bars. The device is of substantially universal application being adaptable to any variable conditions which are likely to be met.

While I prefer to employ the construction as shown in the drawings, it is to be understood that I do not limit the invention thereto except so far as the claims may be so limited by the prior art.

I claim:—

1. In a device of the type described, the combination of a frame comprising top and bottom slotted tubular bars, means slidably mounted in said bottom bar serving to support a license plate on the surface portion of said frame, and a plurality of means slidably mounted in said top bar at an adjustable distance apart for supporting said frame.

2. In a device of the type described, the combination of a frame comprising top and bottom slotted tubular bars, means slidably mounted in said bottom bar serving to support a license plate on the surface portion of said frame, and a plurality of bolts having their heads slidably mounted in said top bar at an adjustable distance from each other for attaching said frame to supporting brackets at different distances apart.

3. In a device of the type described, the combination of a frame comprising a transverse slotted tubular bar, means for supporting the frame on an automobile, and means slidably mounted in said transverse tubular bar adapted to press a license plate yieldingly against said frame for supporting said plate.

4. In a device of the type described, the combination of a frame comprising a transverse slotted tubular bar, means for supporting the frame on an automobile, a block having a sliding fit in said transverse tubular bar, and a flat spring carried by said block adapted to press a license plate yieldingly against said frame for supporting said plate.

5. In a device of the type described, the combination of a frame comprising a transverse slotted tubular bar, means for supporting the frame on an automobile, a block having a sliding fit in said transverse tubular bar, and a member pivotally mounted on said block adapted when in cross relationship to the bar to hold a license plate against the frame for supporting the plate and adapted when swung about its pivotal mounting on the block into alignment with the frame bar to clear the edge of the license plate for permitting removal of the plate.

6. In a device of the type described, the combination of a frame formed from a plurality of oppositely disposed slotted tubular bars and corner brackets connecting said bars, means connected with said frame for supporting the frame in vertical position on an automobile, and members slidably mounted in the several bars adapted to hold a license plate against said frame for supporting said plate.

7. In a device of the type described, the combination of a frame comprising a transversely disposed slotted tubular bar, means connected with said frame for supporting the frame in vertical position on an automobile, blocks slidably mounted in said tubular bar and having neck portions extending outwardly through the slot of the bar, and members mounted on the neck portions of said blocks adapted to hold a license plate against the frame for supporting the plate.

8. In a device of the type described, the combination of a frame comprising a pair of oppositely disposed transverse slotted tubular bars, a pair of oppositely disposed vertical slotted tubular bars, and corner brackets connecting said bars together and holding them in fixed angular relation to each other, a plurality of bolts having their heads slidably mounted in one of said transverse bars at an adjustable distance from each other for supporting said frame, and means slidably mounted in the several tubular bars adapted to press a license plate yieldingly against said frame for supporting the plate.

9. In a device of the type described, the combination of a frame comprising a pair of oppositely disposed transverse slotted tubular bars, a pair of oppositely disposed vertical slotted tubular bars, and corner brackets connecting said bars together and holding them in fixed angular relation to each other, a plurality of bolts having their heads slidably mounted in one of said transverse bars at an adjustable distance from each other for supporting said frame and held by their engagement with the bar against rotation with respect thereto, blocks slidably and removably mounted in said several tubular bars so as to be adjustable therealong, and spring acting fingers carried by said blocks adapted to press a license plate yieldingly against said frame for supporting the plate.

10. In a device of the type described, the combination of a frame comprising a pair of oppositely disposed transverse slotted tubular bars, a pair of oppositely disposed vertical slotted tubular bars, and corner brackets connecting said bars together and holding them in fixed angular relation to each other, a plurality of bolts having their heads slidably mounted in one of said transverse bars at an adjustable distance from each other for supporting said frame, blocks slidably mounted in the several slotted tubular bars so as to be adjustable therealong, and spring fingers pivotally mounted on said blocks adapted when in cross relationship to the respective bars along which they are adjustable to press a license plate yieldingly against the frame for supporting the plate and adapted when swung about their axes into alignment with the respective bars to clear the edges of the plate for permitting its removal.

11. In a device of the type described, the combination of a frame comprising a transverse slotted tubular bar, means for supporting the frame on an automobile, a spring device slidably mounted in said transverse bar adapted to press a license plate yieldingly against said frame for supporting said plate, and means detachably connecting said slidably mounted means with said plate.

12. In a device of the type described, the combination of a frame formed from a plurality of oppositely disposed slotted tubular bars, and corner brackets connecting said bars together, means connected with said frame for supporting the frame in vertical position on an automobile, blocks slidably mounted in the several bars, flat springs swingingly mounted on said blocks adapted to press a license plate yieldingly against the frame for supporting the plate, and bolts passing through openings in said flat springs and said plate for detachably connecting said springs to said plate.

13. In a device of the type described, the combination of a transversely disposed slotted tubular bar, a second bar in spaced relation thereto, cross bars connecting said first named two bars in the form of a frame, means slidably mounted in said tubular bar for securing a license plate in fixed position on said frame, and other means slidably mounted in said tubular bar for attaching said frame to a support.

14. In a device of the type described, the combination of a transversely disposed slotted tubular bar, a second bar in spaced relation thereto, cross bars connecting said first named two bars in the form of a frame, blocks slidably mounted in said tubular bar, arms pivotally mounted on said blocks adapted when in crossed relationship with respect to said bar to press a license plate firmly against said bar, and other means slidably mounted in said tubular bar for attaching said frame to a support.

15. In a device of the type described, the combination of a transversely disposed slotted tubular bar, a second bar in spaced relation thereto, cross bars connecting said first named two bars in the form of a frame, blocks slidably mounted in said tubular bar, arms pivotally mounted on said blocks adapted when in crossed relationship with respect to said bar to press a license plate firmly against said bar, and bolts having their heads slidably mounted in said tubular bar adapted to be tightened into frictional engagement therewith for attaching said frame to a support.

16. In a device of the type described, the combination of a frame formed from a plurality of oppositely disposed slotted tubular bars, and corner brackets connecting said bars, means connected with said frame for supporting the frame in vertical position on an automobile, blocks slidably mounted in the several bars, and arms swingingly mounted on said blocks adapted when in crossed relationship with respect to the bars to hold a license plate against a surface portion of the frame and adapted when swung about their axes into alignment with the bars to clear the edges of the plate for permitting its removal from the frame.

17. In a device of the type described, the combination of a frame formed from a plurality of oppositely disposed slotted tubular bars, and corner brackets connecting said bars, means connected with said frame for supporting the frame in vertical position on an automobile, blocks slidably mounted in the several bars, arms swingingly mounted on said blocks adapted when in crossed relationship with respect to the bars to hold a license plate against a surface portion of the frame and adapted when swung about their axes into alignment with the bars to clear the edges of the plate for permitting its removal from the frame, and means for securing said arms to said plate serving to maintain said arms in their operative plate holding positions.

18. In a device of the type described, the combination of a transversely disposed slotted tubular bar, a second bar in spaced relation thereto, cross bars connecting said first named two bars in the form of a frame, blocks slidably mounted in said tubular bar, and spring arms pivotally mounted on said blocks adapted when in crossed relationship to said bar to press a license plate yieldingly against said bar serving thus to have a frictional grip on said bar.

OLIVER C. RITZ WOLLER.